April 19, 1955 F. W. COFFING 2,706,318
SAFETY HOOK
Filed Oct. 5, 1953
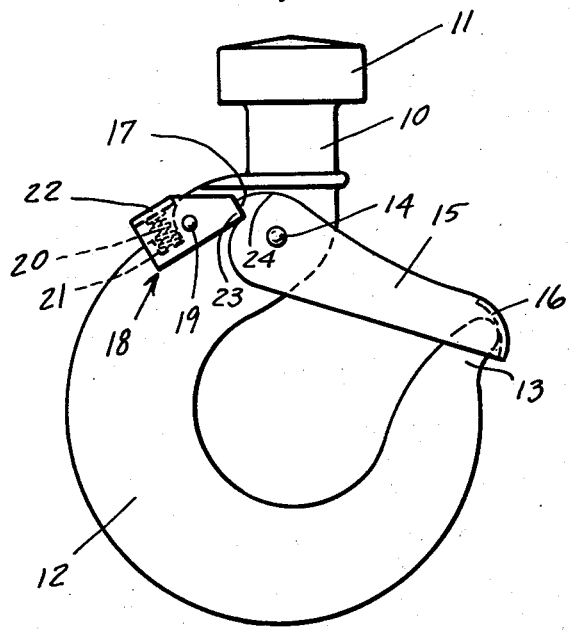
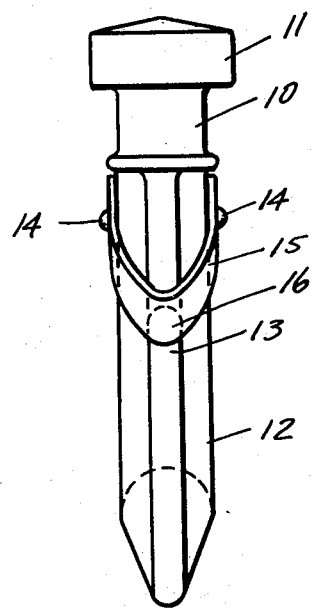
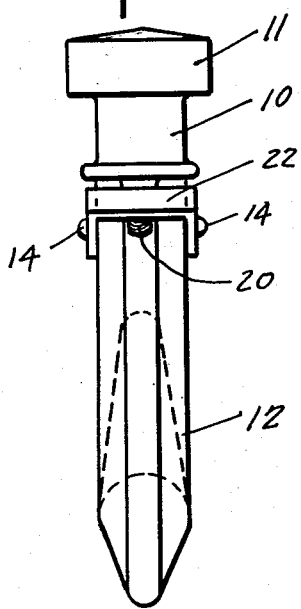
INVENTOR.
FREDRICK W. COFFING.
BY
Lockwood, Galt, Woodard & Smith.
ATTORNEYS.

United States Patent Office 2,706,318
Patented Apr. 19, 1955

2,706,318

SAFETY HOOK

Fredrick W. Coffing, Danville, Ill., assignor to Coffing Hoist Company, Inc., Danville, Ill., a corporation Application October 5, 1953, Serial No. 384,224

2 Claims. (Cl. 24—241)

This invention relates to a hook, and more particularly to a safety hook for use with hoist apparatus and the like.

It is the primary object of this invention to provide a hook having means that will positively lock a loop or the like within the hook, and when desired, may be unlocked readily and with ease to permit disengagement of the loop.

It is a further object of the present invention to provide a single means for holding the lock lever open and for holding it closed. This is accomplished through a two-way spring loaded latch as will hereinafter be described.

It is a still further object of the present invention to provide a hook which is characterized by low head room as distinguished from long head room and that is of push type rather than pull type.

It is a still further object of the present invention to provide a hook which is formed of a minimum number of parts and yet is durable and strong.

It is a still further object of the present invention to provide a hook whose end is capped by the lock or load retaining lever in such manner as to prevent articles from accidentally catching thereon.

The full nature of the invention will be understood from the accompanying drawings and the following description and claims.

In the drawings:

Fig. 1 is a side elevation view of the invention in locked position.

Fig. 2 is a front elevation view thereof.

Fig. 3 is a rear elevation view thereof.

In the drawings the shank of the hook is shown at 10. As will be observed it is relatively short so as to provide low head room. The shank terminates at its upper extremity in the upset head 11 for use with the conventional swivel connection.

The body portion of the safety hook is shown at 12, it being of relatively compact configuration and terminating in the hook 13. Pivotally connected at 14 adjacent its free or inner ends to that portion of the body adjacent the shank is the lock or load retaining lever 15. As will be observed particularly from Fig. 2, this lever is substantially V-shaped with its arms straddling the body portion. The base or outer end 16 of the lever 15 fits over and serves as a cap to the hook end. Thus when the safety hook is in closed position means are provided for preventing objects from accidentally catching on the hook end thereof.

The lever 15 has shoulders or offset portions 17 formed on the ends opposite the capping end 16, i. e. on its inner, pivotal ends. Cooperable with the shoulders is the spring loaded latch shown generally at 18 which holds the lever 15 open and shut. This latch 22 straddles the body portion, is pivotally secured thereto at 19 and is of substantial U-shape as shown particularly in Fig. 3. A spring 20 is nested within a recess 21 formed in the hook body, the upper end of the spring bearing against the under surface of the latch cross member or base 22. The front or outer portions 23 of the latch are shaped to abut the shoulders 17 when the lever is in its closed position as shown for example in Fig. 1. As will be observed, the spring is disposed rearwardly of the pivot pin 19 and serves to urge the front or outer portions 23 of the latch downwardly into locking engagement with the shoulders of the lever.

In operation, when it is desired to lock the lever in closed position as shown in Fig. 1, the lever is manually swung downwardly about its pivot until such time as the cam portions 24 pass the portions 23 of the latch at which time the spring will snap the outer end of latch downwardly into engagement with the shoulders. At such time the lever will be in closed position and it will be retained and positively locked in that position by the action of the latch. Not until the outer end of the latch 22 is pivoted upwardly by the application of manual pressure upon the spring will it be possible to swing the lever 15 out of closed or locked position.

Once the lever shoulder is thus swung out of locked position and in under the latch, the manual pressure upon the spring will be released whereupon the spring will operate to urge the latch downwardly against the cam surfaces 24 thereby holding the lever in open position. Not until the lever is once again manually swung downwardly will the tension of the spring be overcome sufficiently to enable the lever to be moved to closed position. Thus the latch performs the two-way function of not only locking the lever in closed position but as well of retaining it in open position. This results because the depending arms or sides of the latch are in the same plane with the arms of the lever.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. In a safety hook, a supporting shank, a body depending from said shank and terminating in a hook, a load retaining lever provided at one end with a pair of spaced parallel arms straddling said body and of a length to engage over the end of said hook at its free end, a pivot connecting said spaced arms with said body adjacent its juncture with said shank, shoulders on said parallel arms on the ends thereof opposite to said lever, a latch comprising spaced plates straddling and pivoted to said body beyond said arms, a spring holding said plates with their free end portions engaged with the edges of said spaced parallel arms, and the free ends of said plates lockingly engaged with said shoulders when said lever is engaged at its free end with said hook end.

2. In a safety hook, a supporting shank, a body depending from said shank and terminating in a hook, a load retaining lever provided at one end with a pair of spaced parallel arms straddling said body, a pivot connecting said arms with said body at its juncture with said shank and above the end of said hook, the free end of said lever engaging over the end of said hook, shoulders on said parallel arms disposed in a plane including said pivot and the free end of said lever when the latter is engaged with said hook end, a latch comprising spaced plates straddling said body behind said arms, and a spring holding said latch with the free ends of said plates lockingly engaged with said shoulders when the lever is in closed position.

References Cited in the file of this patent

UNITED STATES PATENTS

| 70,750 | Sargent | Nov. 12, 1867 |
| 172,355 | Steele | Jan. 18, 1876 |
| 1,289,616 | Berger | Dec. 31, 1918 |
| 1,576,352 | Nordling | Mar. 9, 1932 |
| 1,879,168 | Freysinger | Sept. 27, 1932 |